(12) United States Patent
Susever et al.

(10) Patent No.: US 11,160,388 B2
(45) Date of Patent: *Nov. 2, 2021

(54) SYSTEM FOR MANUFACTURING STRING OF POCKETED COIL SPRINGS

(71) Applicant: Ümit Elektronik Makina Sanayi Ve Ticaret A.S., Istanbul (TR)

(72) Inventors: Mahmut Zeki Susever, Istanbul (TR); John Chamlee, Lawrenceville, GA (US); Juan Carlos Rodriguez, Istanbul (TR); Van Nguyen, Istanbul (TR); Brian Davis, Istanbul (TR)

(73) Assignee: Ümit Elektronik Makina Sanayi Ve Ticaret A.S., Istanbul (TR)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,588

(22) Filed: Dec. 9, 2019

(65) Prior Publication Data

US 2020/0178699 A1    Jun. 11, 2020

Related U.S. Application Data

(63) Continuation of application No. 15/534,611, filed as application No. PCT/US2015/064676 on Dec. 9, 2015, now Pat. No. 10,499,746.

(Continued)

(51) Int. Cl.
*B23P 19/00* (2006.01)
*B23P 19/12* (2006.01)
(Continued)

(52) U.S. Cl.
CPC .......... *A47C 27/064* (2013.01); *B21F 23/007* (2013.01); *B21F 27/16* (2013.01);
(Continued)

(58) Field of Classification Search
CPC ...... A47C 27/064; B21F 23/007; B21F 33/04; B21F 35/003; B68G 9/00; B23P 19/008;
(Continued)

(56) References Cited

U.S. PATENT DOCUMENTS 1,835,589 A    12/1931    Bond
2,854,034 A    9/1958    Waful
(Continued)

FOREIGN PATENT DOCUMENTS

GB    446895 A    5/1936
WO    0238304 A1    5/2002

OTHER PUBLICATIONS

International Search Report and Written Opinion for related International Application No. PCT/US2015/064676 dated Apr. 7, 2016.

*Primary Examiner* — Jermie E Cozart
(74) *Attorney, Agent, or Firm* — Troutman Pepper Hamilton Sanders LLP; Dustin B. Weeks

(57) ABSTRACT

A system for manufacturing a string of pocketed coil springs comprising: a coil-forming subsystem that produces two coil springs; a spring transporter subsystem that receives the two coil springs at a first position and conveys the two coil springs to a second position; a spring compressor subsystem that compresses the two coil springs; a fabric-folding subsystem that receives a piece of fabric and folds the fabric to create an open side; a spring inserter subsystem that receives the two compressed coil springs and inserts the two compressed coil springs between top and bottom surfaces of a folded piece of fabric; two welder subsystems that form first and second welds between top and bottom surfaces of the folded piece of fabric, the first welds and the second welds forming a plurality of pockets in the fabric, each of the plurality of pockets comprising a compressed coil spring.

9 Claims, 17 Drawing Sheets

Related U.S. Application Data

(60) Provisional application No. 62/089,610, filed on Dec. 9, 2014.

(51) Int. Cl.
| | |
|---|---|
| *B23P 21/00* | (2006.01) |
| *A47C 27/06* | (2006.01) |
| *B21F 27/16* | (2006.01) |
| *B68G 9/00* | (2006.01) |
| *B21F 23/00* | (2006.01) |
| *B21F 33/04* | (2006.01) |
| *B21F 35/00* | (2006.01) |
| *F16F 3/04* | (2006.01) |

(52) U.S. Cl.
CPC ............ *B21F 33/04* (2013.01); *B21F 35/003* (2013.01); *B23P 19/008* (2013.01); *B23P 19/12* (2013.01); *B23P 21/006* (2013.01); *B68G 9/00* (2013.01); *B68G 2009/005* (2013.01); *F16F 3/04* (2013.01); *Y10T 29/49613* (2015.01); *Y10T 29/53383* (2015.01)

(58) Field of Classification Search
CPC .. B23P 19/12; B23P 21/006; Y10T 29/49613; Y10T 29/53383
See application file for complete search history.

(56) References Cited

U.S. PATENT DOCUMENTS

| | | |
|---|---|---|
| 2,862,630 A | 12/1958 | Nelson et al. |
| 3,779,058 A | 12/1973 | Norman |
| 4,439,977 A | 4/1984 | Stumpf |
| 5,186,435 A | 2/1993 | Smith |
| 5,713,115 A | 2/1998 | Knoepfel et al. |
| 5,788,051 A | 8/1998 | Knoepfel et al. |
| 5,875,664 A | 3/1999 | Scott et al. |
| 6,029,957 A | 2/2000 | Zysman |
| 6,159,319 A | 12/2000 | Mossbeck |
| 6,260,331 B1 | 7/2001 | Stumpf |
| 6,408,514 B1 | 6/2002 | Mossbeck et al. |
| 6,751,933 B2 | 6/2004 | Huss |
| 6,922,895 B1 | 8/2005 | Whitworth |
| 10,499,746 B2 * | 12/2019 | Susever ................ B21F 23/007 |
| 2011/0148018 A1 | 6/2011 | Defranks et al. |
| 2013/0247518 A1 | 9/2013 | Spinks et al. |

* cited by examiner

SYSTEM FOR MANUFACTURING STRING OF POCKETED COIL SPRINGS

CROSS REFERENCE TO RELATED APPLICATION

This application is a continuation of U.S. patent application Ser. No. 15/534,611, filed 9 Jun. 2017, which is a national stage application based on International Patent Application No. PCT/2015/064676, filed 9 Dec. 2015, which claims the benefit of U.S. Provisional Patent Application No. 62/089,610, filed 9 Dec. 2014, the contents of which are fully incorporated herein by reference.

TECHNICAL FIELD OF THE INVENTION

The various embodiments of the present disclosure relate generally to coilers. More particularly, the various embodiments of the present invention are directed to systems and methods for manufacturing strings of pocketed coils to be used to assemble a mattress.

BACKGROUND OF THE INVENTION

Spring form mattresses are conventionally manufactured through the assembly of multiple strings of pocketed coils. A string of pocketed coils comprises an elongated piece of fabric with individual pockets located therein, each pocket encompassing an individual spring. Parallel string segments can be bonded together to form a mattress assembly.

The mattress assembly process typically consists of two different stations or systems—a coiler that receives a fabric and wire to produce a string of pocketed coils and an assembler that receives the string of pocketed coils and assembles parallel segments of the string together to form the mattress assembly. Because each string segment processed by the assembler comprises multiple pocketed coils, which must first be created by the coder, the coiler is commonly understood to be the bottleneck of the manufacturing process.

Therefore, there is a desire for improved coilers capable of manufacturing pocketed coils in a faster and more efficient manner. Various embodiments of the present invention address such a desire.

BRIEF SUMMARY OF THE INVENTION

The present invention relates to systems and methods for manufacturing a string of pocketed coils. An exemplary embodiment of the present invention provides multi-head toiler comprising at least two spring coilers, a spring transporter, a spring compressor, a fabric folding member, a spring inserter, a first welder, a second welder, and a spring expander. Each of the at least two spring coilers can be configured to simultaneously produce a spring coil. The spring transporter can be configured to simultaneously receive the at last two spring coils produced by the spring coilers and transport the at least two spring coils to the spring compressor. The spring compressor can be configured to simultaneously compress the at least two spring coils. The fabric folding member can be configured to receive an elongated piece of fabric and fold the piece of fabric along its longitudinal axis to create top and bottom fabric plies. The spring inserter can be configured to simultaneously receive the at least two compressed spring coils and simultaneously insert the at least two compressed spring coils between the top and bottom fabric plies. The first welder can be configured to weld an edge of the folded fabric parallel to the longitudinal axis of the fabric and opposite the folded edge of the fabric to join the top and bottom fabric plies. The second welder can be configured to weld the top and bottom fabric plies together along lines that are transverse to the longitudinal axis of the fabric between each of the compressed spring coils to create a plurality of pockets in the fabric, each pocket encompassing a compressed spring coil. The spring expander can be configured to expand each of the compressed spring coils within the plurality of pockets.

The present invention also provides methods of making a string of pocketed springs. In an exemplary embodiment of the present invention, the method comprises: simultaneously making at least two spring coils; simultaneously transporting the at least two spring coils to a compressor; simultaneously compressing the at least two spring coils; simultaneously inserting the at least two compressed spring coils between top and bottom plies of a piece of fabric folded along its longitudinal axis; welding the top and bottom plies of the fabric along a long edge of the folded fabric parallel to the longitudinal axis of the fabric and opposite the folded edge of the fabric; welding the top and bottom plies of the fabric along lines that are transverse to the longitudinal axis of the fabric between each of the compressed spring coils to create a plurality of pockets in the fabric, each pocket encompassing a compressed spring coil; and expanding each of the compressed spring coils with each of the plurality of pockets.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

To facilitate an understanding of the principles and features of the present invention, various illustrative embodiments are explained below. The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

As discussed above, the bottleneck of the conventional mattress assembly systems is in the system for producing the string of pocketed spring coils. Specifically, conventional systems are unable to produce the string of coils at a rate that can keep up with the speed at which the assembler can assemble segments of the string of coils. One reason for this drawback is that conventional systems only operate on a single spring coil at any given time while the coil traverses the different stations of conventional systems.

The present invention addresses these disadvantages of conventional systems by providing systems that produce a string of pocketed coils much faster and more efficient than conventional systems. One way in which this is accomplished in the present invention is through the simultaneous processing of multiple spring coils through the inventive systems. As shown in FIGS. 1-15, an exemplary embodiment of the present invention is shown in which two spring coils are processed simultaneously at various portions of the system. The dual-coil system shown is shown in the associated figures and discussed below for purposes of simplification only. The present invention, however, is not limited to systems that process two spring coils simultaneously. Rather, those skilled in the art would recognize that the present invention encompasses systems capable of processing more than two spring coils simultaneously, including, but not limited to, systems for processing 3, 4, 5, or 6 coils simultaneously.

Figure 1:
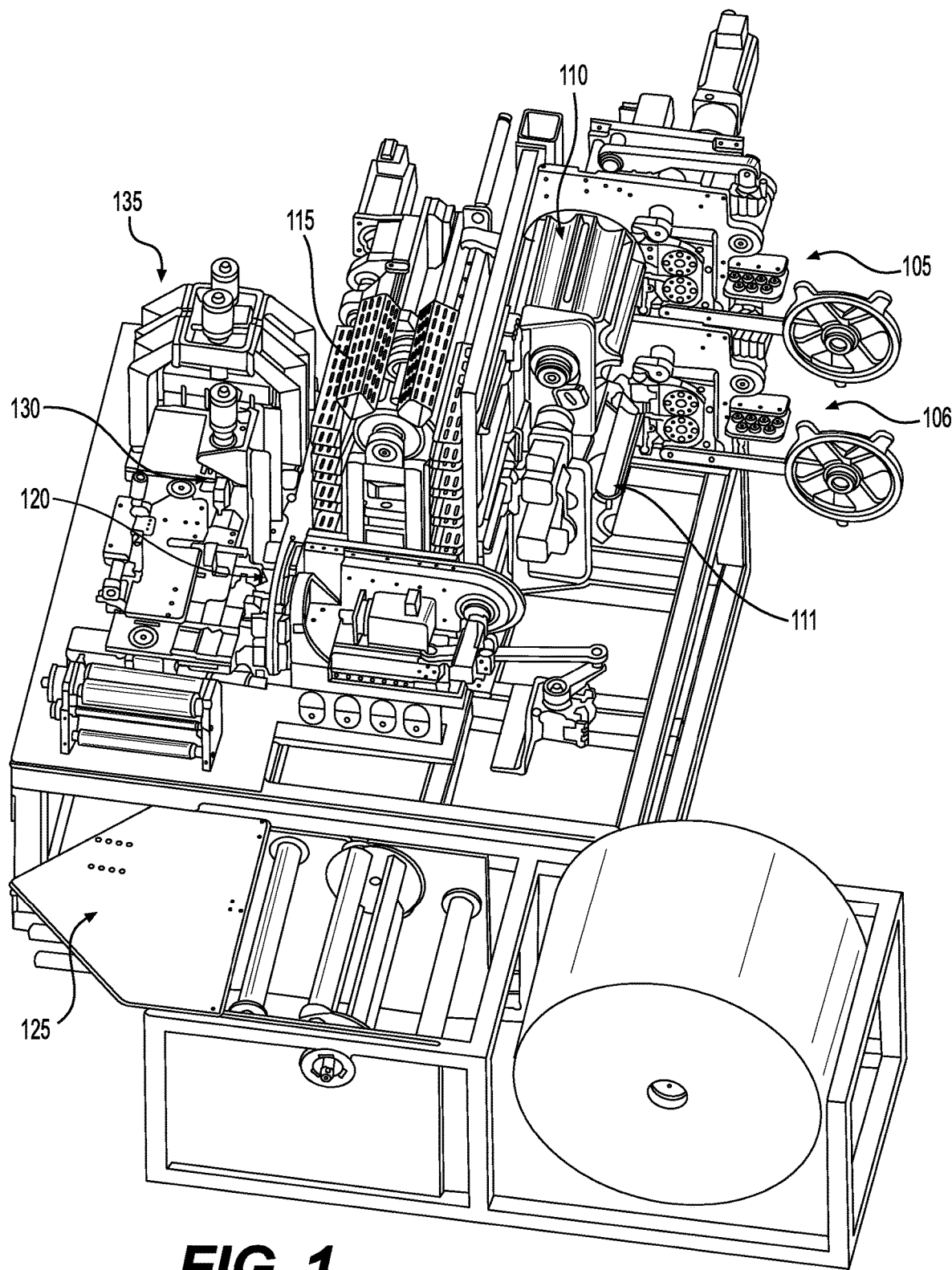
FIG. 1 provides a perspective view of a system for producing a string of pocketed spring coils, in accordance with an exemplary embodiment of the present invention.
Figure 2:
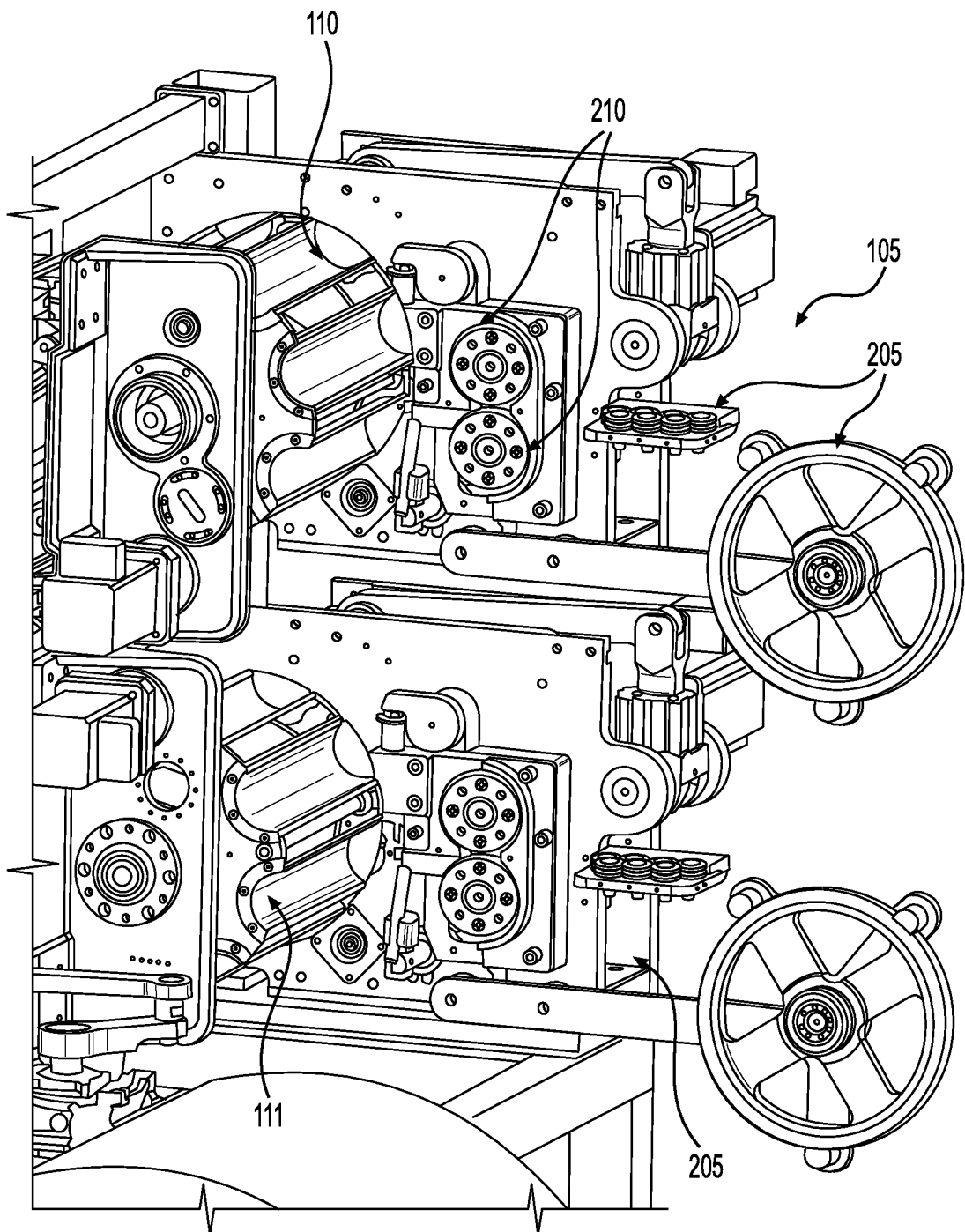
FIG. 2 provides a perspective view of a portion of the system shown in FIG. 1 proximate the first and second coders, in accordance with an exemplary embodiment of the present invention.
Figure 3:
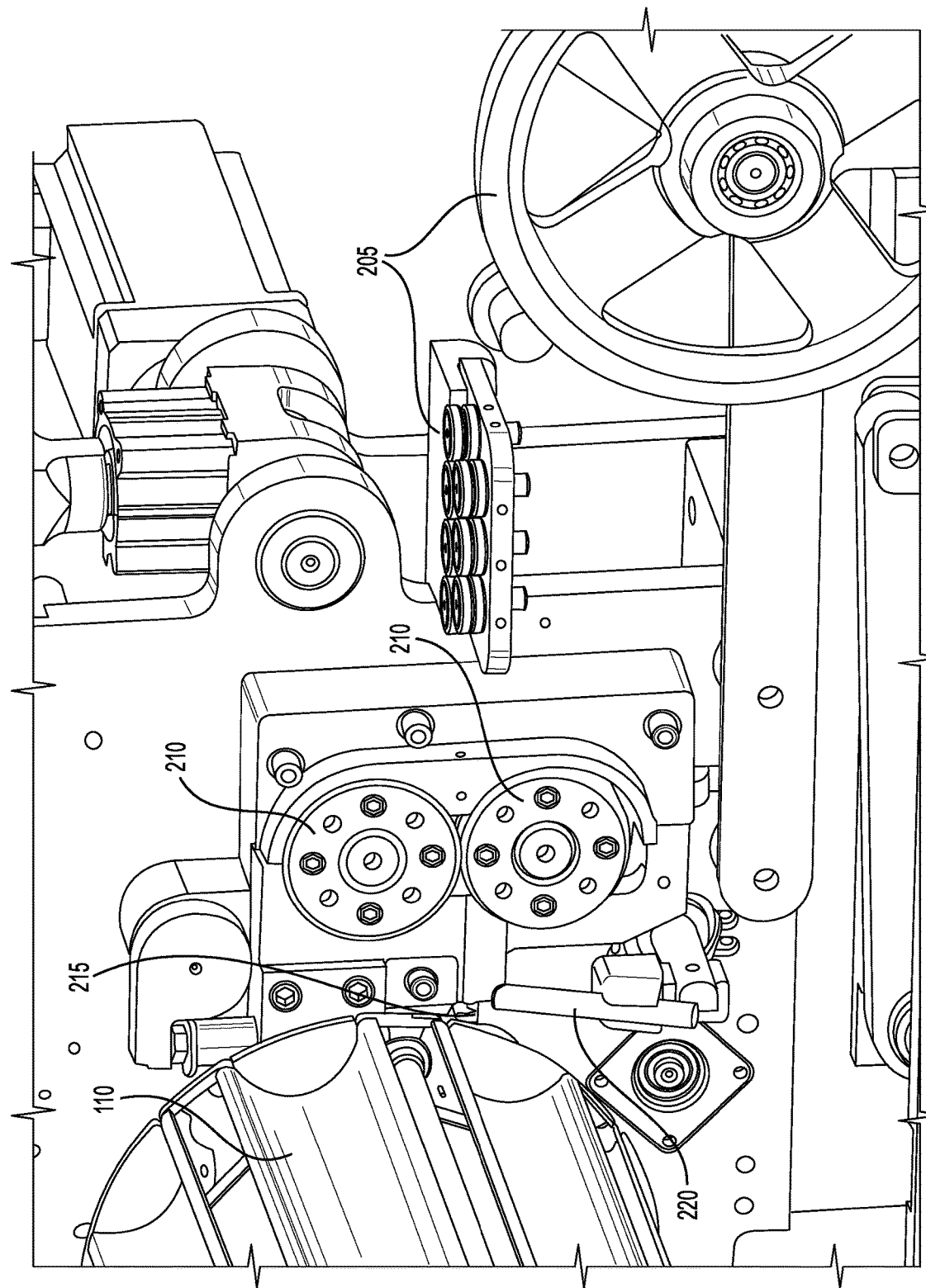
FIG. 3 provides a perspective view of a portion of the system shown in FIG. 1 proximate the first coiler, in accordance with an exemplary embodiment of the present invention.
Figure 4:
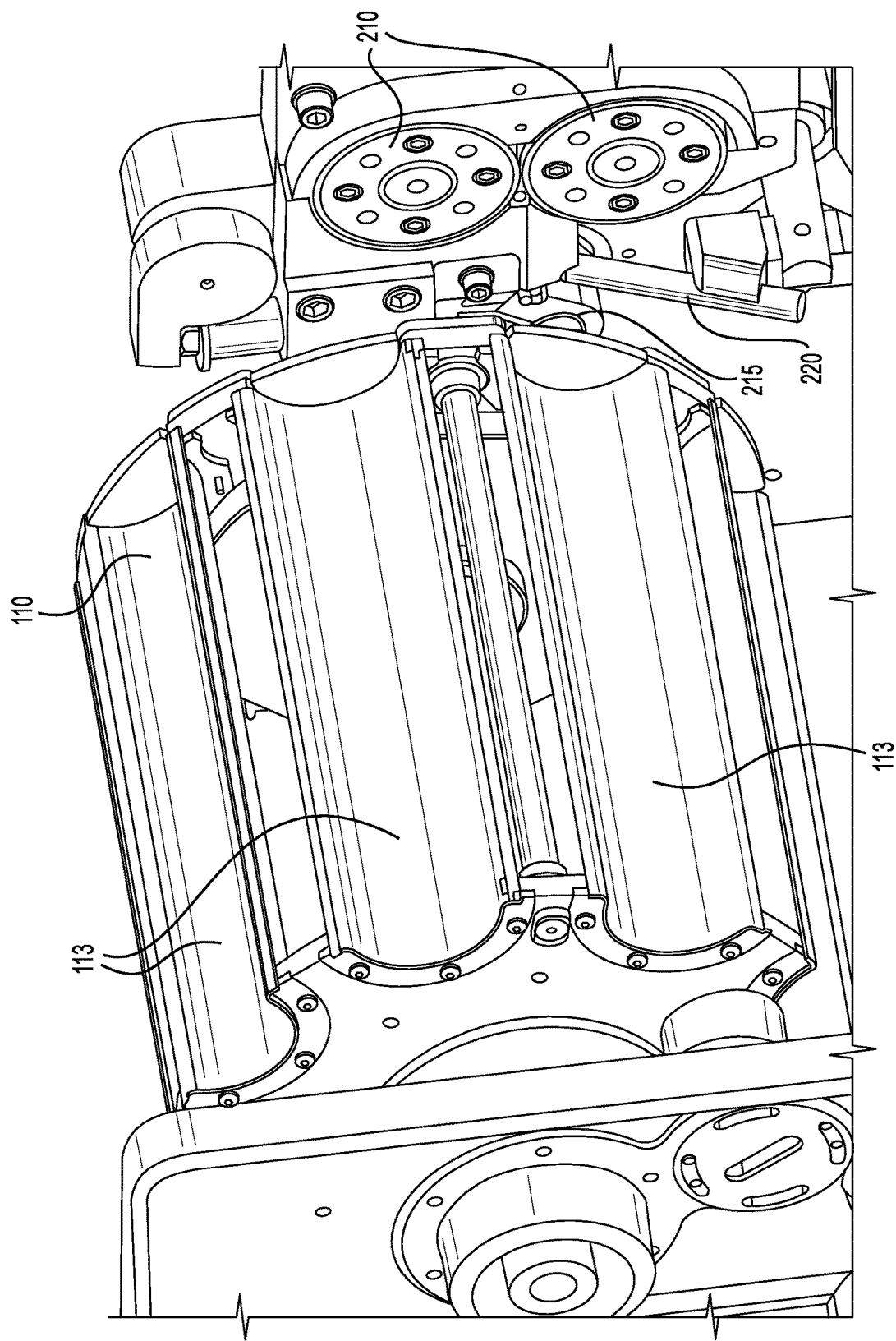
FIG. 4 provides a perspective view of a portion of the system shown in FIG. 1 proximate the first transport wheel and first coiler, in accordance with an exemplary embodiment of the present invention.
Figure 5:
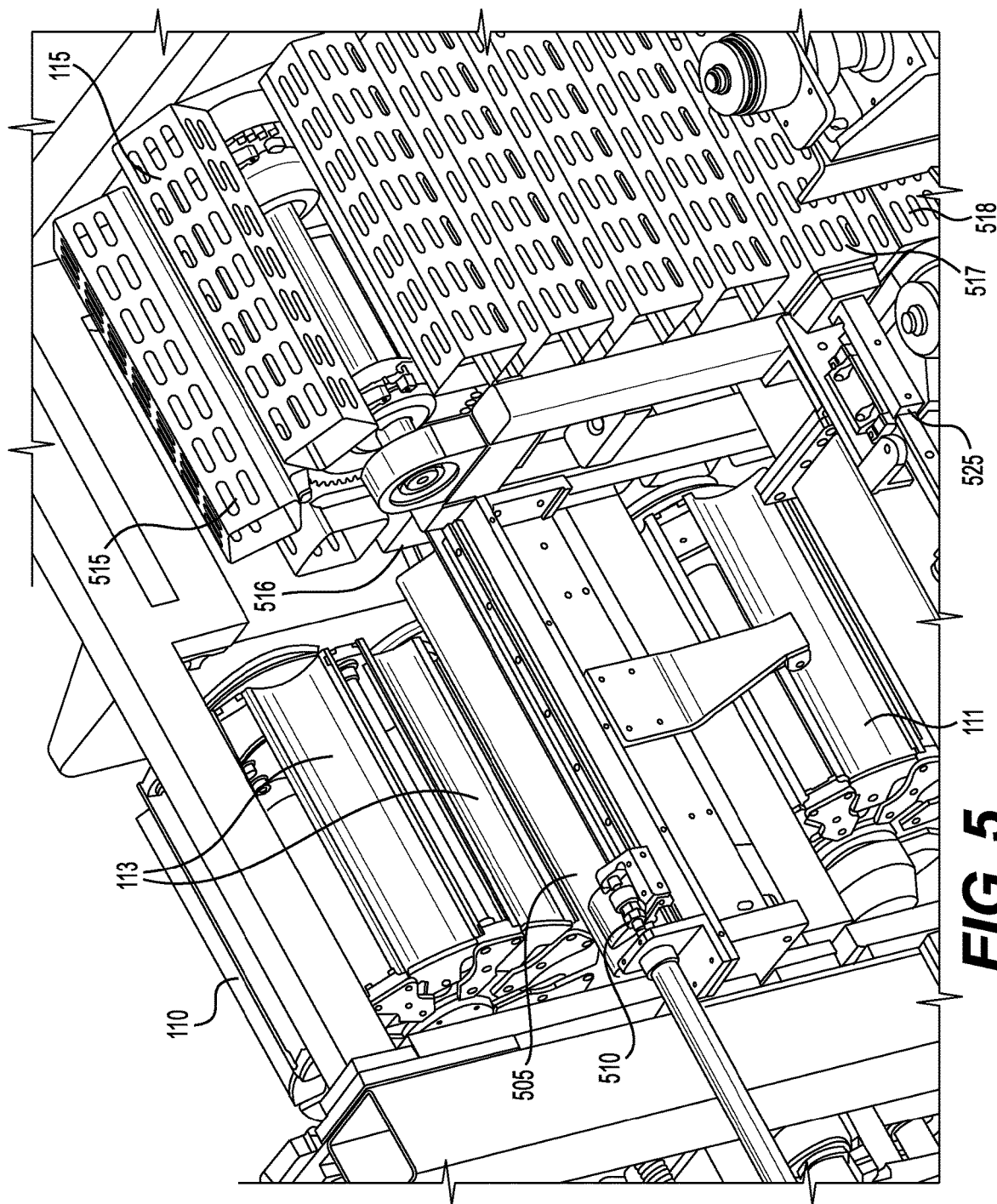
FIG. 5 provides a perspective view of a portion of the system shown in FIG. 1 proximate the first and second transport wheels and the conveyor, in accordance with an exemplary embodiment of the present invention.
Figure 6:
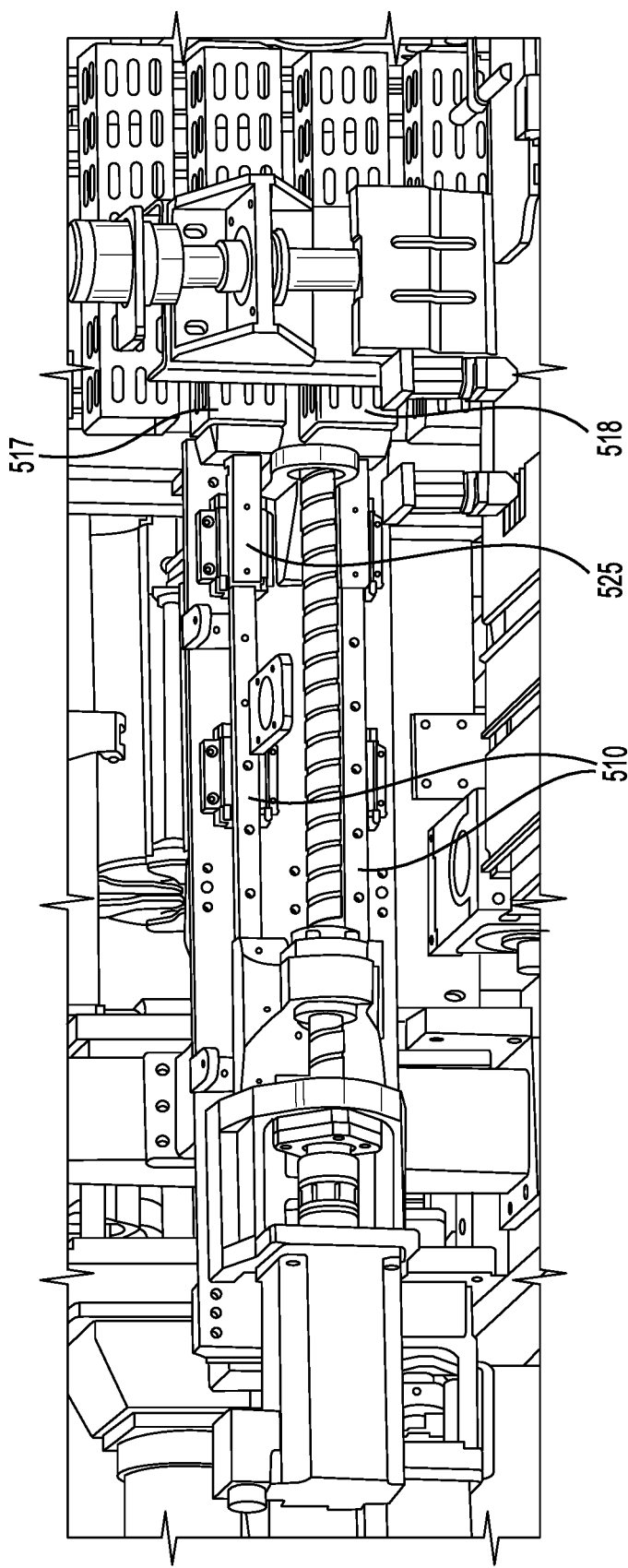
FIG. 6 provides a perspective view of a portion of the system shown in FIG. 1 proximate the compressor and conveyor, in accordance with an exemplary embodiment of the present invention.

Embodiments of the present invention can comprise at least two spring coilers configured to produce spring coils. The number of spring coilers can vary in accordance with various embodiments of the present invention. For convenience, an embodiment with two spring coilers 105 106 is discussed below. As shown in FIGS. 1-2, an exemplary embodiment of the present invention comprises a first spring coiler and a second spring coiler. Each coiler 105 106 can operated independently of the other to produce spring coils. The first and second coiler 105 106 can operate to produce spring coils simultaneously. For convenience, operation of the first coiler 105 is described below. Unless specified otherwise, operation of the second coiler 106 is substantially similar to the first coiler 105.

The first coiler 105 is configured to receive a wire from a wire source. The first coiler 105 can have a plurality of wire guide/feed/drive wheels 205 210 of varying shapes and sizes for guiding the wired to the appropriate position within the coiler 105. The wire can be pulled into the coiler 105 through two opposing drive/feed wheels 210, each of which can be driven by a motor. As the wire enters the coiler 105 it can be deflected by a curvature member 215 and a pitch member 220. The position of the curvature member 215 can be adjusted to alter the desired radius of curvature for the spring coil. In some embodiments of the present invention, the position of the curvature member 215 can be adjusted during production of a spring coil to vary the radius of curvature at various portions of the same spring coil. For example, this could allow the radius of curvature to be greater at the center of the spring coil than at the ends. In an exemplary embodiment of the present invention, the curvature member 215 is rotatably connected to a body of the coiler 105. As the curvature member 215 rotates, a distance of the wire contacting surface of the curvature member 215 to the guide wheels 210 and/or an angle of the wire contacting surface with respect the incoming wire can change to alter the radius of curvature. In some embodiments of the present invention, the curvature member 215 can move translationally (as opposed to rotatably) with respect to the wire guides 210 to vary the distance of the wire contacting surface of the curvature member 215 to the guide wheels 210 and/or an angle of the wire contacting surface with respect the incoming wire to alter the radius of curvature. In some embodiments of the present invention, the curvature member 215 can move rotatably and translationally. In some embodiments, the curvature member 215 can move only rotatably. In some embodiments, the curvature member 215 can move only translationally. Movement of the curvature member 215 can be accomplished through many different ways known in the art. In an exemplary embodiment, the curvature member 215 can be moved by a servomotor. For example, for rotational movement, the output shaft of the servomotor can be directly connected to the curvature member 215, such that rotation of the output shaft causes rotation of the curvature member 215. For example, for translational movement, the output shaft of the servomotor can be coupled to the curvature member 215 via a worm gear.

As discussed above, the first coiler 105 can also comprise a pitch member 220 for controlling the pitch of the spring coil (i.e., the number of revolutions the wire makes over a certain distance along the longitudinal axis of the spring coil). The distance from the wire contacting surface of the pitch member 220 to the wire guide and/or the angle of the wire contacting surface with respect to the incoming wire can be varied to control the pitch. In some embodiments of the present invention, the pitch member 220 is rotatably connected to the body of the coiler such that rotation of the pitch member 220 can vary the distance from the wire contacting surface of the pitch member 220 to the wire guide 210 and/or the angle of the wire contacting surface with respect to the incoming wire to control the pitch. In some embodiments of the present invention, the pitch member 220 can move translationally with respect to the wire guide 210 to vary the distance from the wire contacting surface of the pitch member 220 to the wire guide 210 and/or the angle of the wire contacting surface with respect to the incoming wire to control the pitch. Movement of the pitch member 220 can be accomplished through many different ways known in the art. In an exemplary embodiment, the pitch member 220 can be moved by a servomotor. In an exemplary embodiment, for rotational movement, the output shaft of the servomotor can be directly connected to the pitch member 220, such that rotation of the output shaft causes rotation of the pitch member 220. In another exemplary embodiment, for translational movement, the output shaft of the servomotor can be coupled to the pitch member 220 via a worm gear.

Some embodiments of the present invention can further comprise a spring coil transporter for transporting the springs from the spring coilers 105 106 to a spring compressor 525. The spring transporter can be configured to simultaneously receive a coil from each of the two or more spring coilers and simultaneously transport the spring coils to the spring compressor 525. As shown in FIGS. 1-5 and 7, in an exemplary embodiment of the present invention, the spring transporter can comprise a spring transport wheel 110 111 for each of the spring coders 105 106. The spring transport wheel 110 111 can have a plurality of recesses 113 for receiving and holding the spring coils during transportation to the compressor 525. The transport wheels 110 111 can receive a spring in a recess 113 of the transport wheel 110 111 from their respective spring coiler 105 106. The transport wheel 110 111 can then rotate to advance the spring coil to the spring compressor 525 and allow another spring coil from the spring coiler 105 106 to be received in an adjacent recess 113 to the recess carrying the previous spring coil. Once the transport wheels 110 111 rotate to an output position for each wheel 110 111, the spring coil can fall out of the recess of the transport wheel 110 111 to a platform 505 for each transport wheel 110 111 where in injection arm 510 of each platform 505 can push the spring coil into a basket 516 on a conveyor 115 having a plurality of baskets 515 516 517 518. The injection arms 510 can simultaneously inject a spring coil from each transport wheel 110 111 into a corresponding basket 516 of the conveyor 115. The conveyor 115 can then rotate to advance the spring coils towards the spring compressor 525.

Various embodiments of the present invention can also comprise a compressor 525 to compress the spring coils. In an exemplary embodiment, at least two springs can be simultaneously compressed. In an exemplary embodiment, the spring compressor 525 comprises a plurality of compression arms 510 configured to compress the spring coils along their longitudinal axis. The compression arms 510 can compress the springs many different ways known in the art, including, but not limited to, pneumatic actuation, hydraulic actuation, spring actuation, worm gears, and the like. In some embodiments, the compression arms 510 can extend into baskets 517 518 of the conveyor to compress the spring coils. In some embodiments, the compression arms 510 can extend into adjacent baskets 517 518 of the conveyor.

Figure 9A:
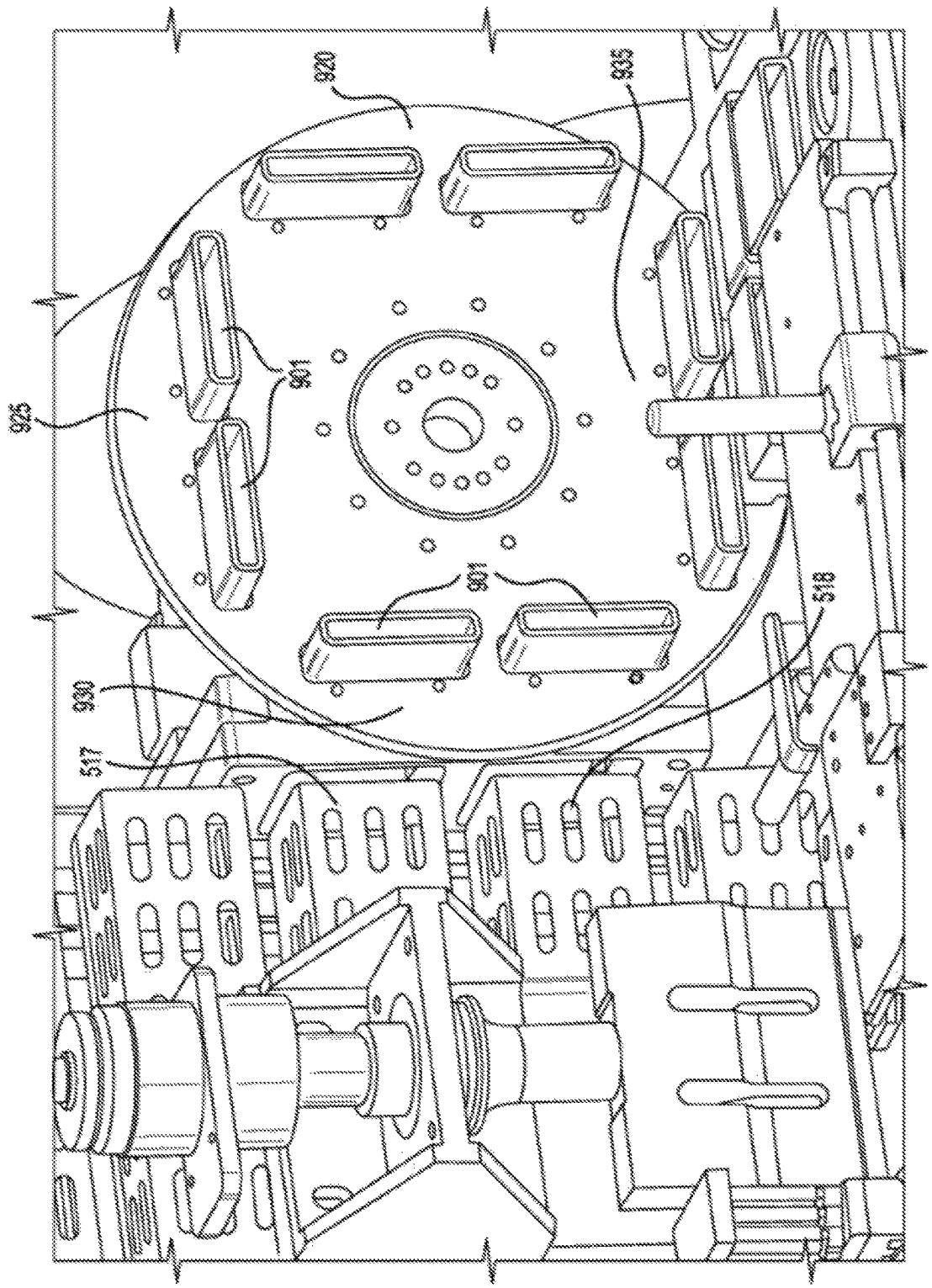
FIG. 9a provides a perspective view of a portion of the system shown in FIG. 1 proximate the conveyor and spring inserter, in accordance with an exemplary embodiment of the present invention.
Figure 9B:
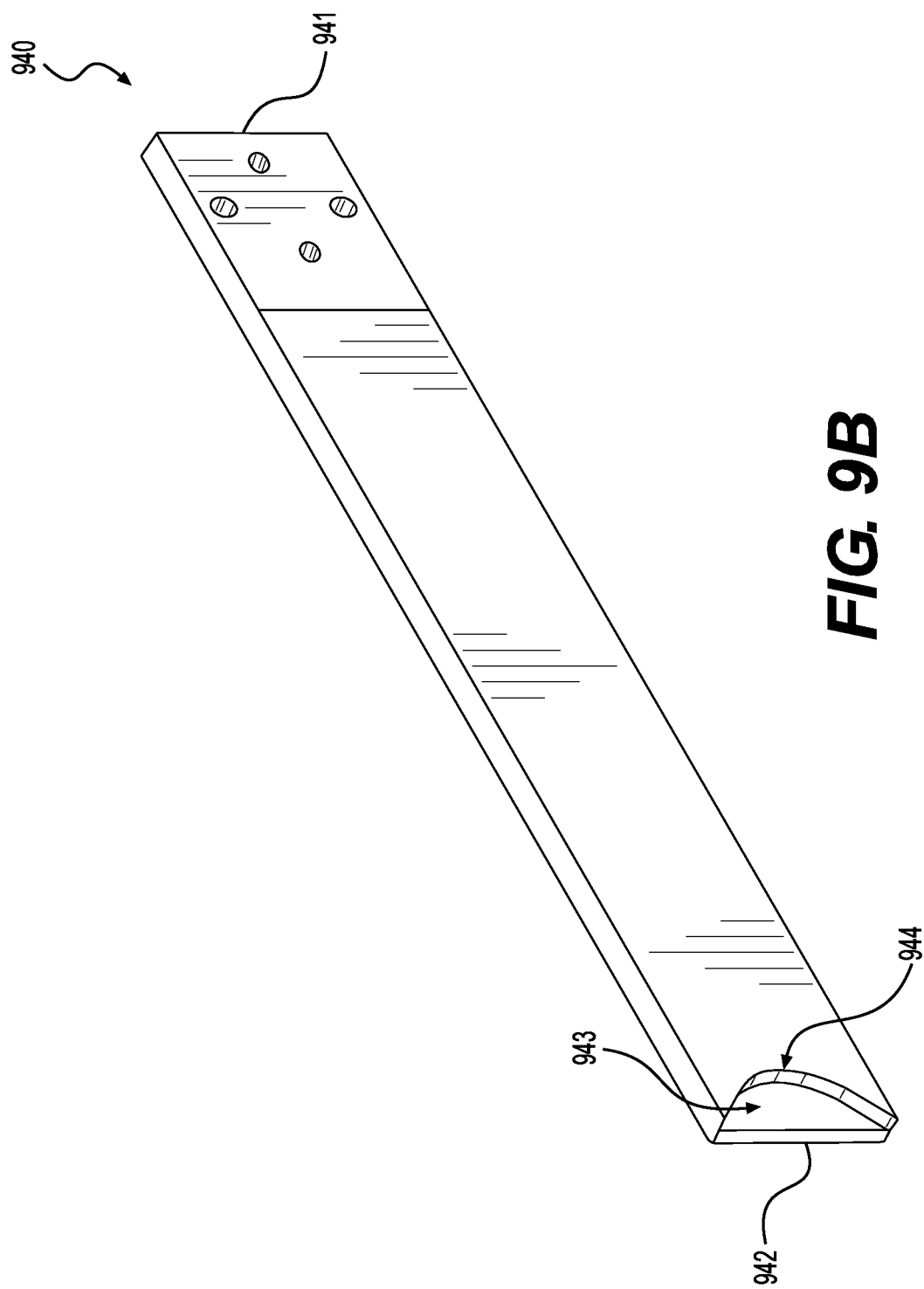
FIG. 9b provides a view of a push plate, in accordance with an exemplary embodiment of the present invention.
Figure 15:
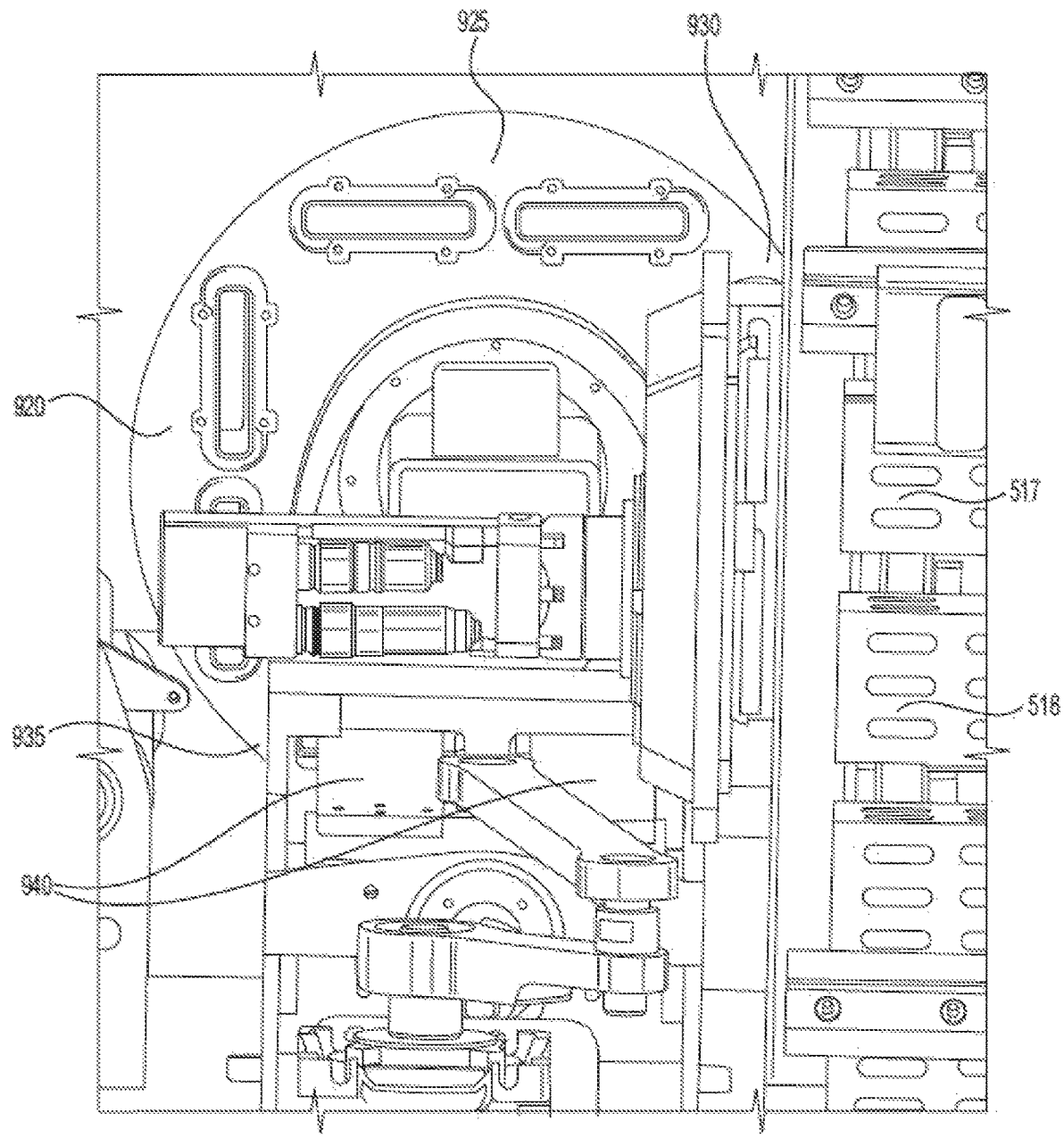
FIG. 15 provides a perspective view of a portion of the system shown in FIG. 1 proximate the spring inserter and conveyor, in accordance with an exemplary embodiment of the present invention.

After the springs are compressed, the compressed springs can be transported into a spring inserter 120. As shown in FIGS. 7, 9a, and 10-12, the spring inserter 120 can comprise a plurality of apertures 901 for receiving the compressed springs. The spring inserter 120 can also rotate through a plurality of positions 920 925 930 935. In one embodiment, the spring inserter 120 comprises an input position 930 and an output position 935. In some embodiments, the spring inserter 120 comprises a plurality of sides, each capable of rotating from the input position 930, to the output position 935, and back to the input position 930. In some embodiments, each side of the spring inserter 120 comprises an aperture 901 to receive each compressed spring. For example, as shown in FIGS. 7, 9a, and 10-12, two springs are compressed by the spring compressor 525 in two adjacent baskets 517 518 of the conveyor 115. Once the springs are compressed, the springs can be inserted into adjacent apertures 901 on the same side of the spring inserter 120 at an input position 930. Once the compressed springs are inserted into the apertures 901 on a side of the spring inserter 120, the spring inserter 120 can rotate to a second position 920 925 935, such that a second side of the spring inserter 120 is not at the input position and ready to receive compressed springs. Rotation of the spring inserter 120 can continue until the first side of the spring inserter is located at an output position 935. At the output position 935, the compressed springs can be ejected from the spring inserter 120 and inserted between top and bottom plies of a piece of fabric (not shown). In some embodiments, the compressed springs can be ejected from the spring inserter 120 between the top and bottom plies using a push plate 940, as shown in FIGS. 9b and 15. In some embodiments, as shown in FIG. 9b, a push plate 940 can comprise a first end 941 and a second end 942. In some embodiments, the second end 942 can push the compressed springs out of the apertures 901 of the spring inserter 120. In some embodiments, the second end 942 comprises a protruding first side 943 and an indented second side 944, which may include a half-moon shape. Accordingly, in some embodiments, when the second end 942 is inserted (i.e., plunged) through an aperture 901 of the spring inserter 120, the protruding first side 943 engages a first end of a compressed coil prior to engagement of the second end of the compressed coil by the second side 944 of the push plate 940. As will be appreciated, such engagement causes the compressed coil to splay as it is inserted into the top and bottom plies such that the first and second ends of the compressed coil are offset from the longitudinal axis of the coil. As will be appreciated further, the splaying of the compressed coil during insertion assists in the eventual deployment of the coils, as is discussed below. The piece of fabric can then be advanced along when the spring inserter 120 rotates, such that additional compressed springs can be ejected from the spring inserter 120 and inserted between top and bottom plies of a piece of fabric at another location along the fabric.

Figure 7:
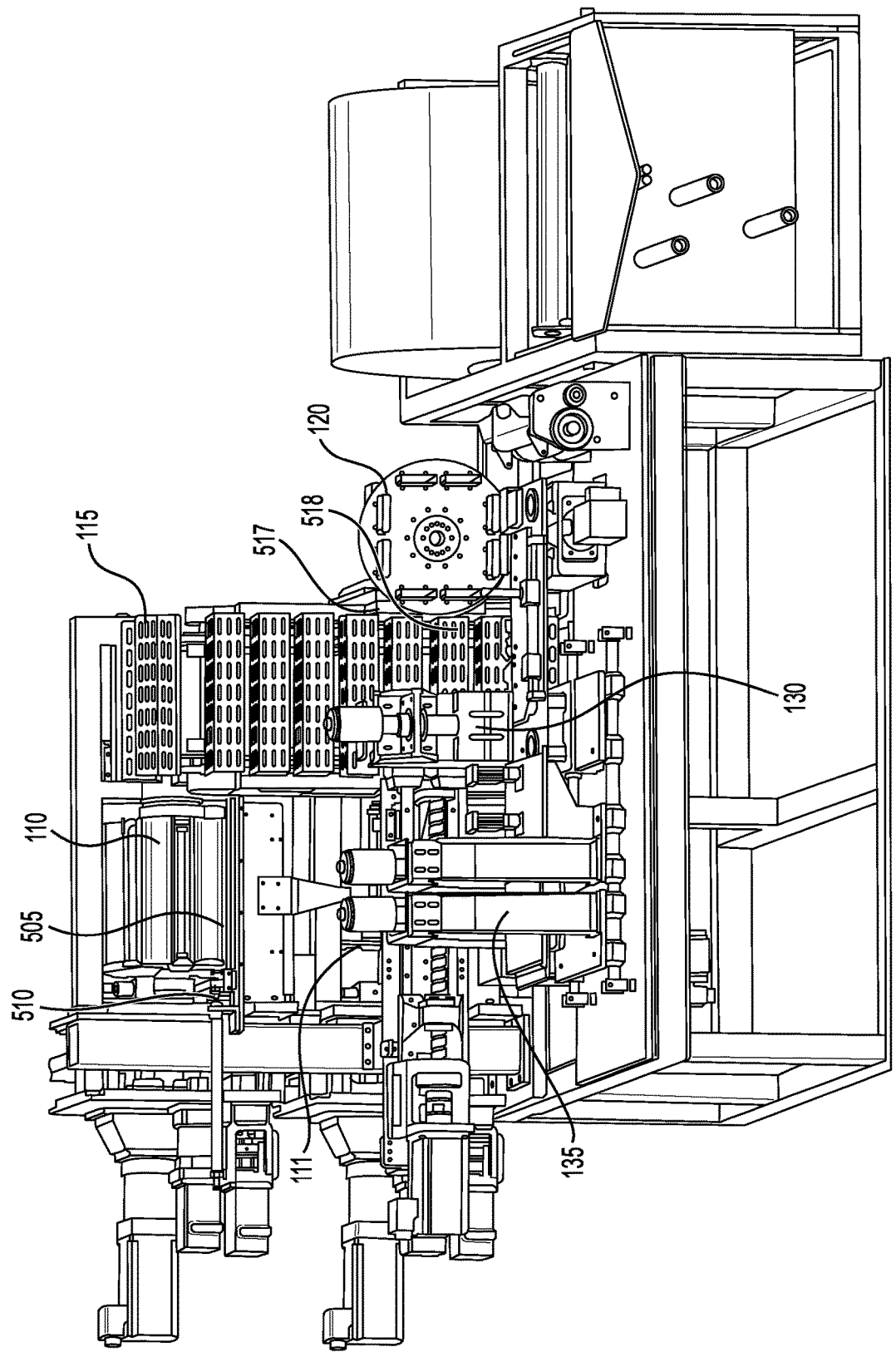
FIG. 7 provides a perspective view of a system for producing a string of pocketed spring coils, in accordance with an exemplary embodiment of the present invention.
Figure 8:
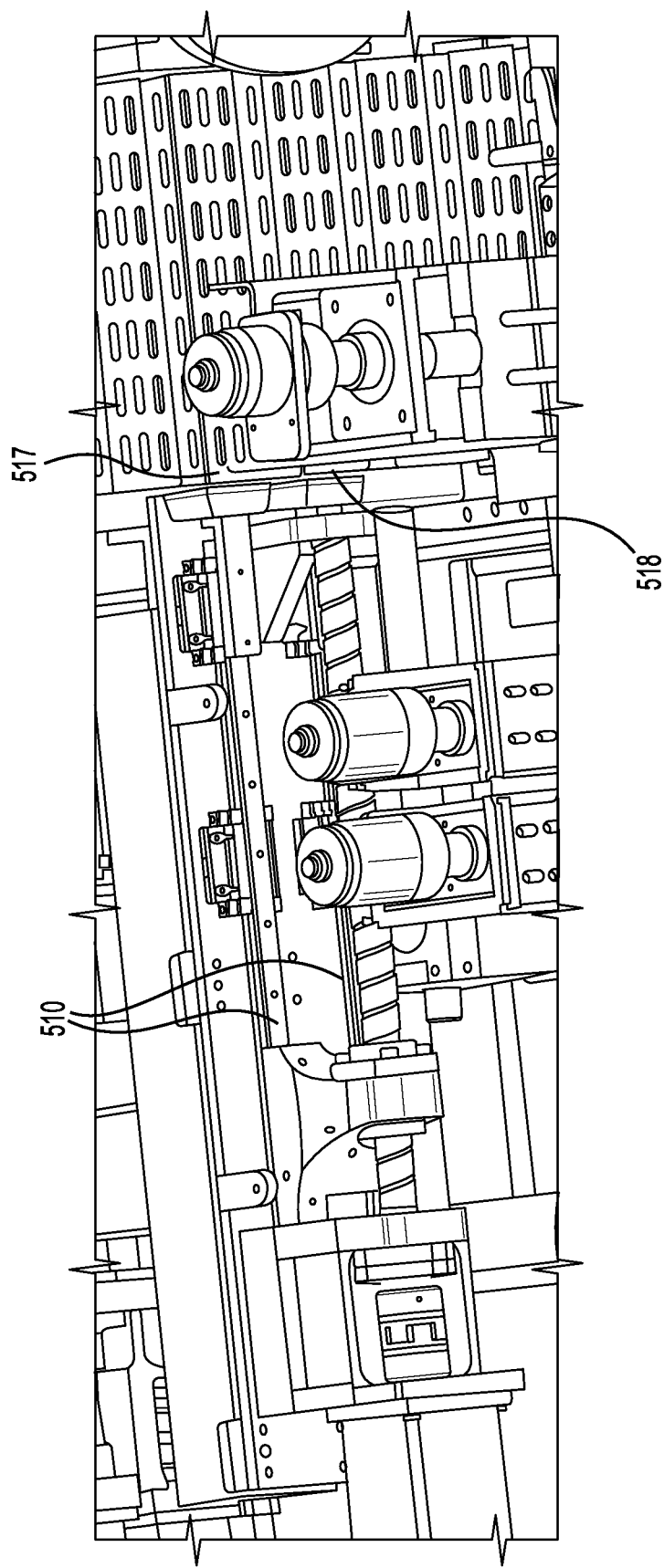
FIG. 8 provides a perspective view of a portion of the system shown in FIG. 1 proximate the compressor and conveyor, in accordance with an exemplary embodiment of the present invention.
Figure 10:
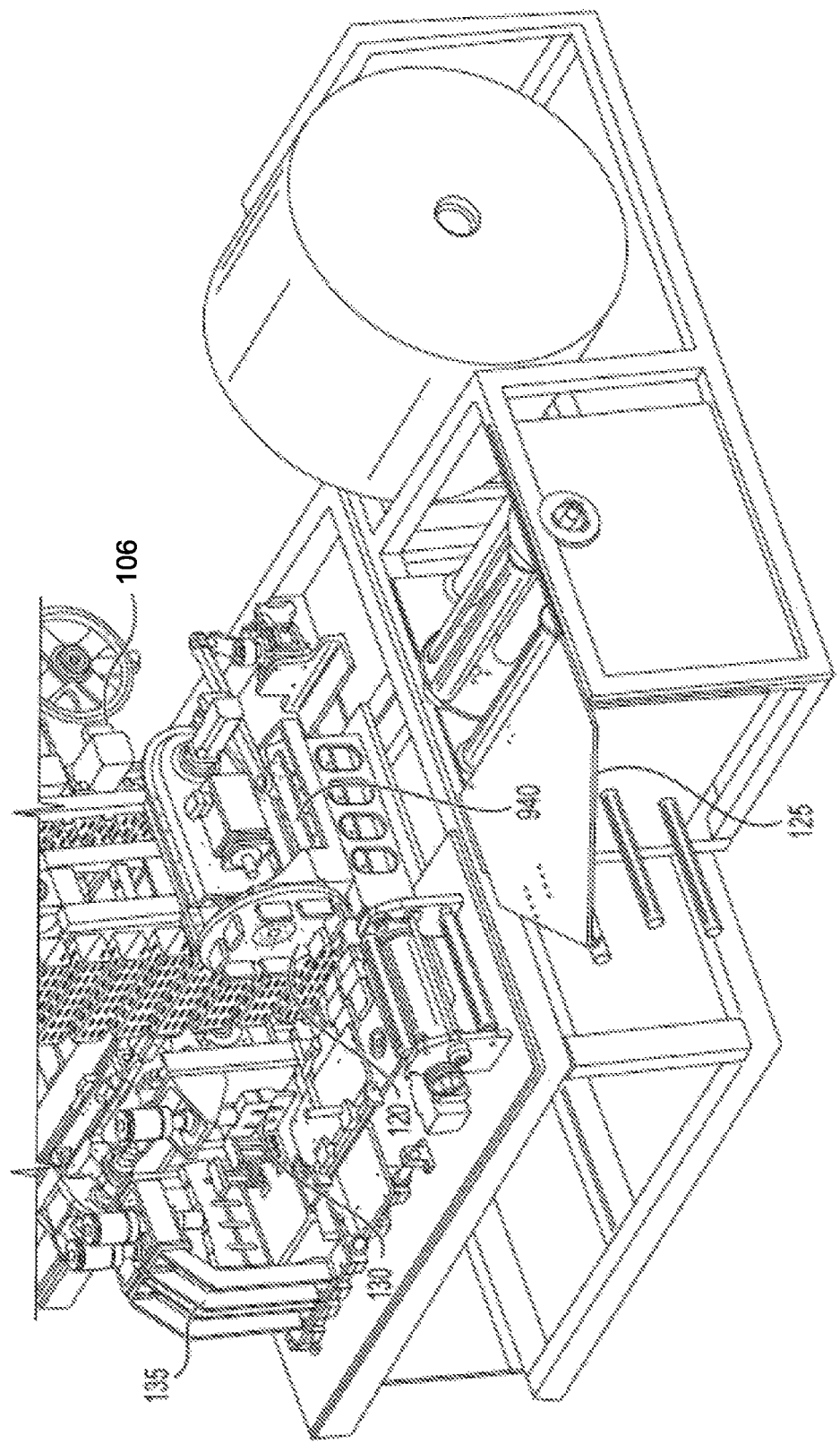
FIG. 10 provides a perspective view of a system for producing a string of pocketed spring coils, in accordance with an exemplary embodiment of the present invention.

As shown in FIGS. 1, 7, and 10, some embodiments of the present invention can also comprise a fabric folding member 125 configured to receive a piece of fabric and fold the fabric along its longitudinal axis to produce a folded piece of fabric with top and bottom plies, a folded edge parallel to the longitudinal axis, and an open edge parallel to the longitudinal axis and opposite the folded edge. As shown in FIGS. 1, 7, and 10, the fabric folding member 125 can comprise an angled side such that the fabric propagates away from the folding member in a direction transverse to the direction in which the fabric is received to the folding member 125.

As discussed above, the folded fabric can traverse a position proximate the spring inserter 120 where the compressed springs are inserted proximate the open edge of the folded fabric between the top and bottom plies. After the compressed springs are inserted into the fabric, the fabric can traverse towards a first welder 130 that welds the top and bottom plies of the folded fabric together along the open edge. After the open edge of the folded fabric is welded, that portion of the fabric can traverse towards a second welder 135 that welds the top and bottom plies together along a line from the open edge to the folded edge (transverse to the longitudinal axis of the fabric) between each of the compressed spring coils. In some embodiments, the second welder 135 is configured to weld two lines simultaneously on each side of the compressed spring. The first and second welder 130 135 can join the top and bottom plies of the fabric together an accordance with many different methods known in the art, including, but not limited to, hot weld fusing the top and bottom plies together, sewing the top and bottom plies together, applying an adhesive to join the top and bottom plies together, and the like. Additionally, the weld lines created by the first and second welders can be both linear and non-linear in accordance with various embodiments of the present invention. For example, the first welder 130 could create a linear weld along the open edge and the second welder 135 could create a non-linear weld (or multiple non-linear welds) between each of the compressed springs (e.g., the non-linear weld could correspond to a non-linear exterior envelope of an expanded spring).

Figure 11A:
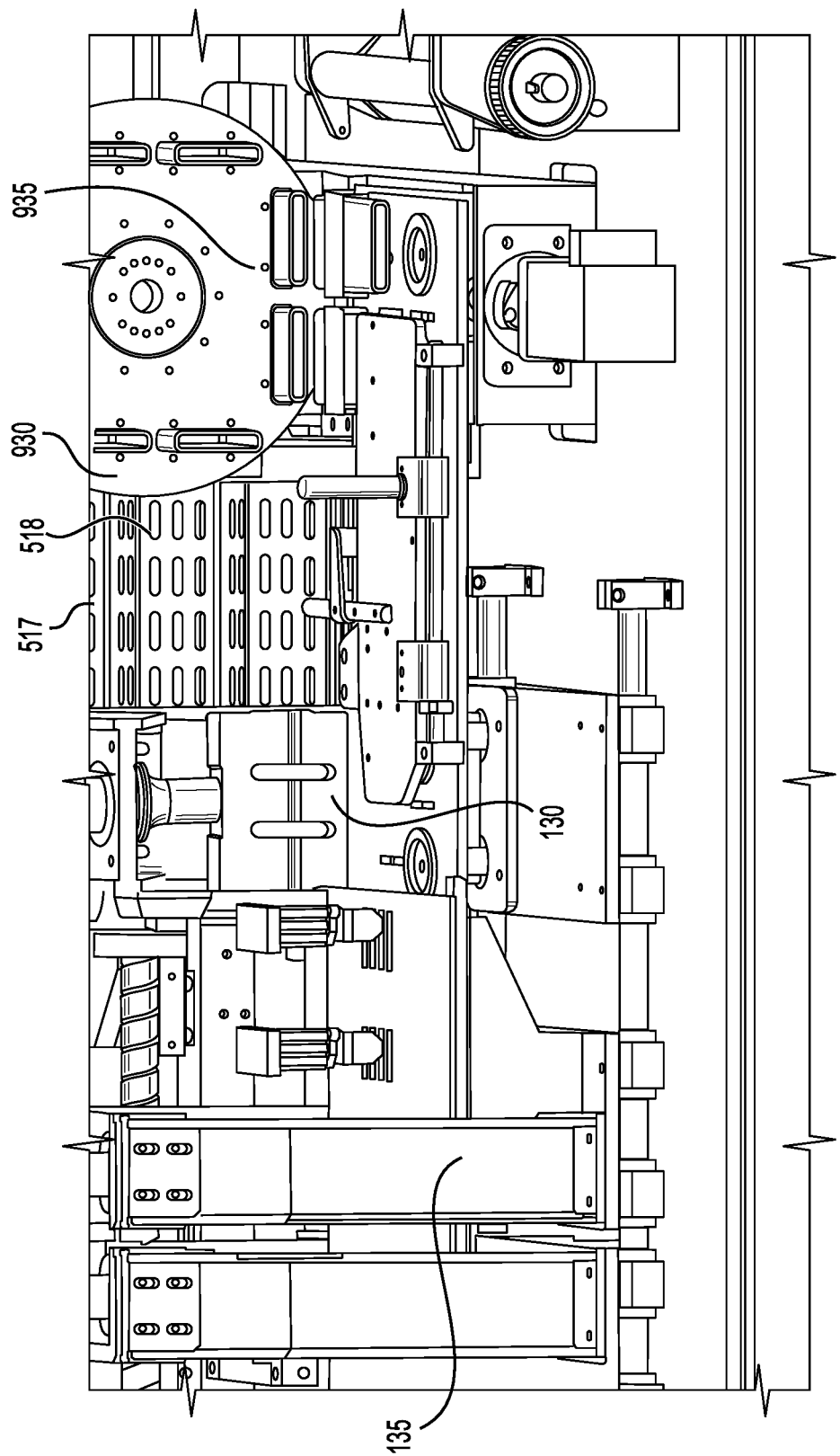
FIG. 11a provides a perspective view of a portion of the system shown in FIG. 1 proximate the spring inserter, conveyor, first welder, and second welder, in accordance with an exemplary embodiment of the present invention.
Figure 11B:
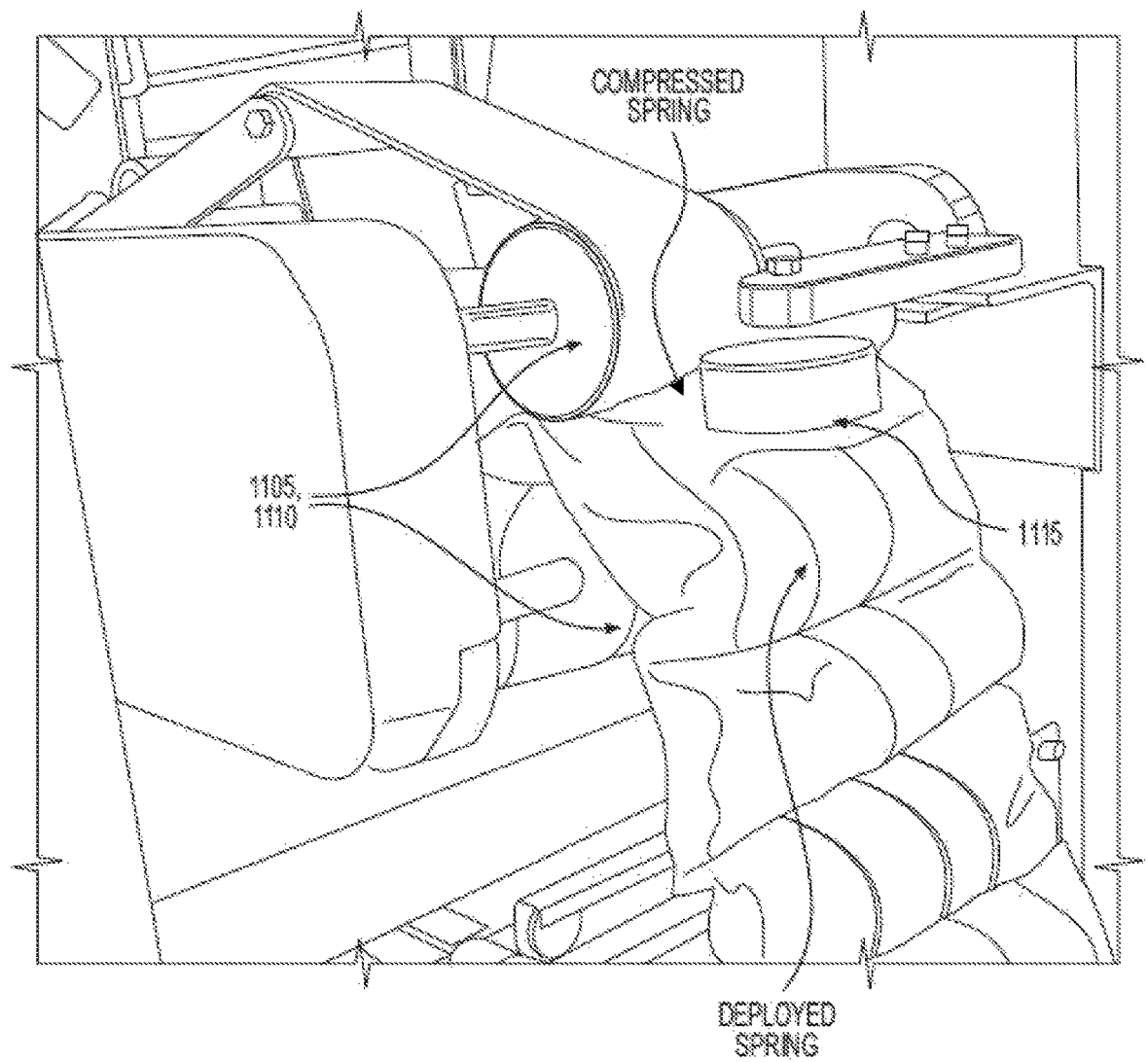
FIG. 11b provides a view of a conveyor system for transporting the fabric, in accordance with an exemplary embodiment of the present invention.
Figure 12:
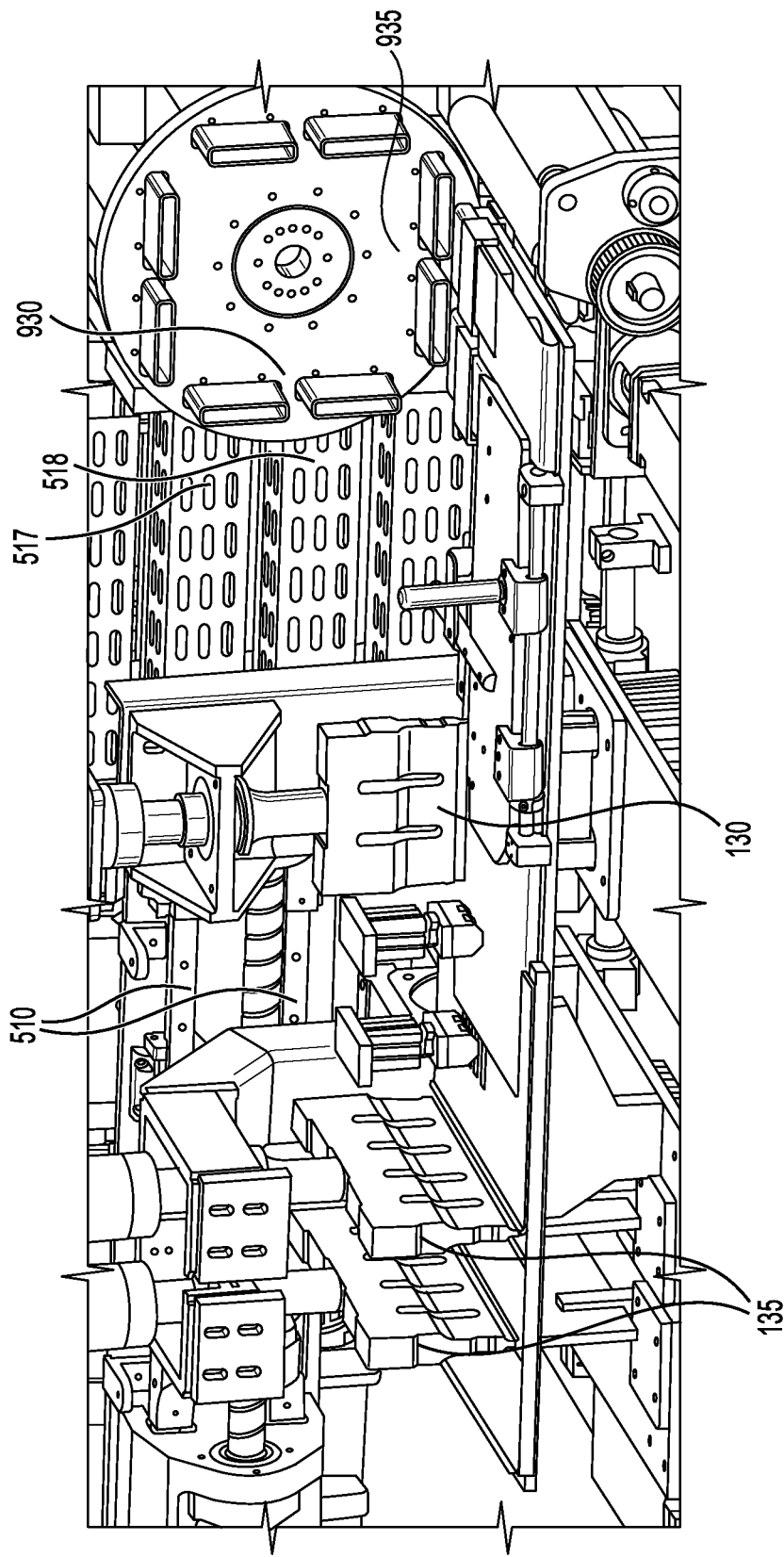
FIG. 12 provides a perspective view of a portion of the system shown in FIG. 1 proximate the spring inserter, conveyor, first welder, and second welder, in accordance with an exemplary embodiment of the present invention.
Figure 13:
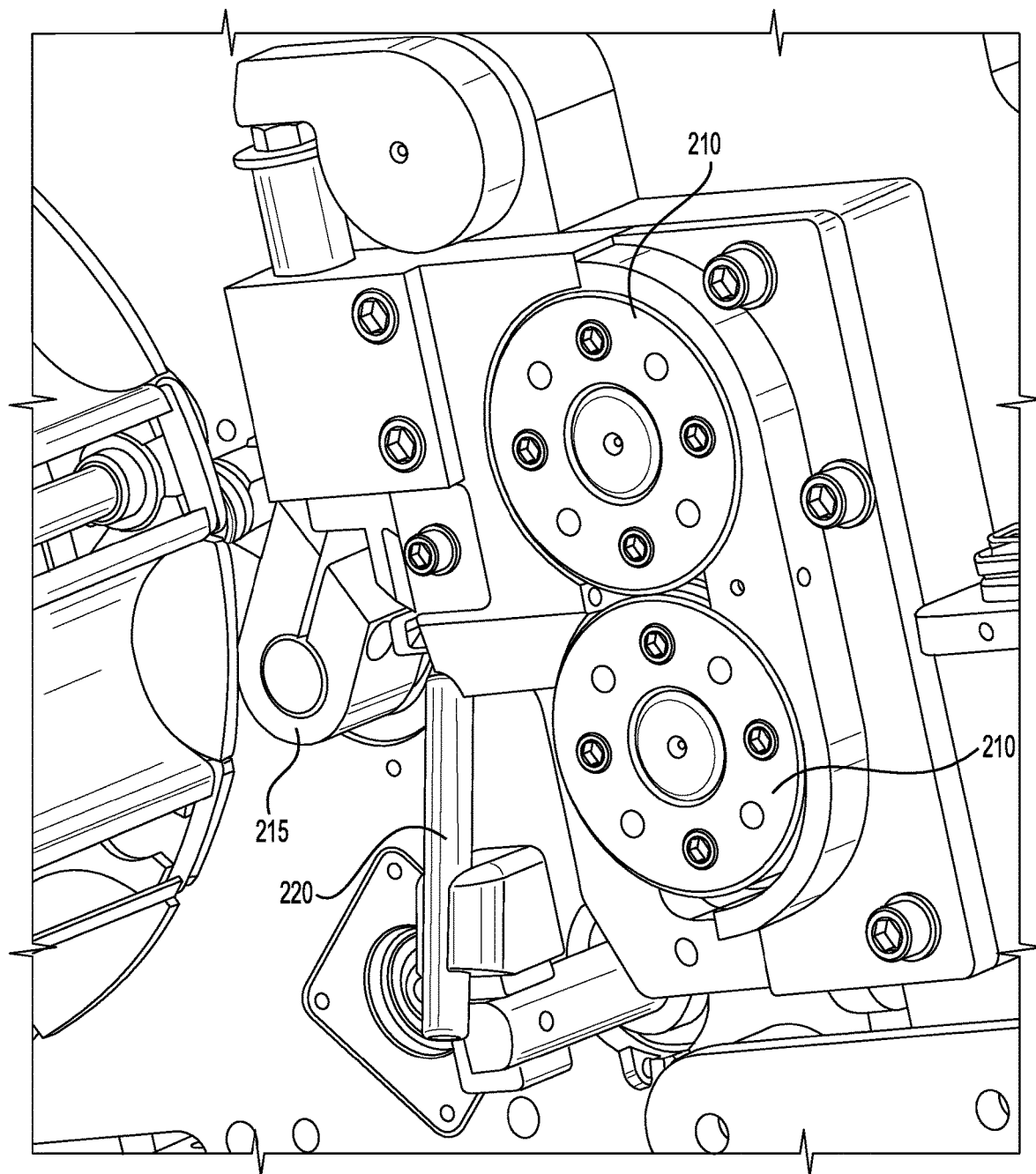
FIG. 13 provides a perspective view of a portion of the system shown in FIG. 1 proximate the first coiler and first transport wheel, in accordance with an exemplary embodiment of the present invention.
Figure 14:
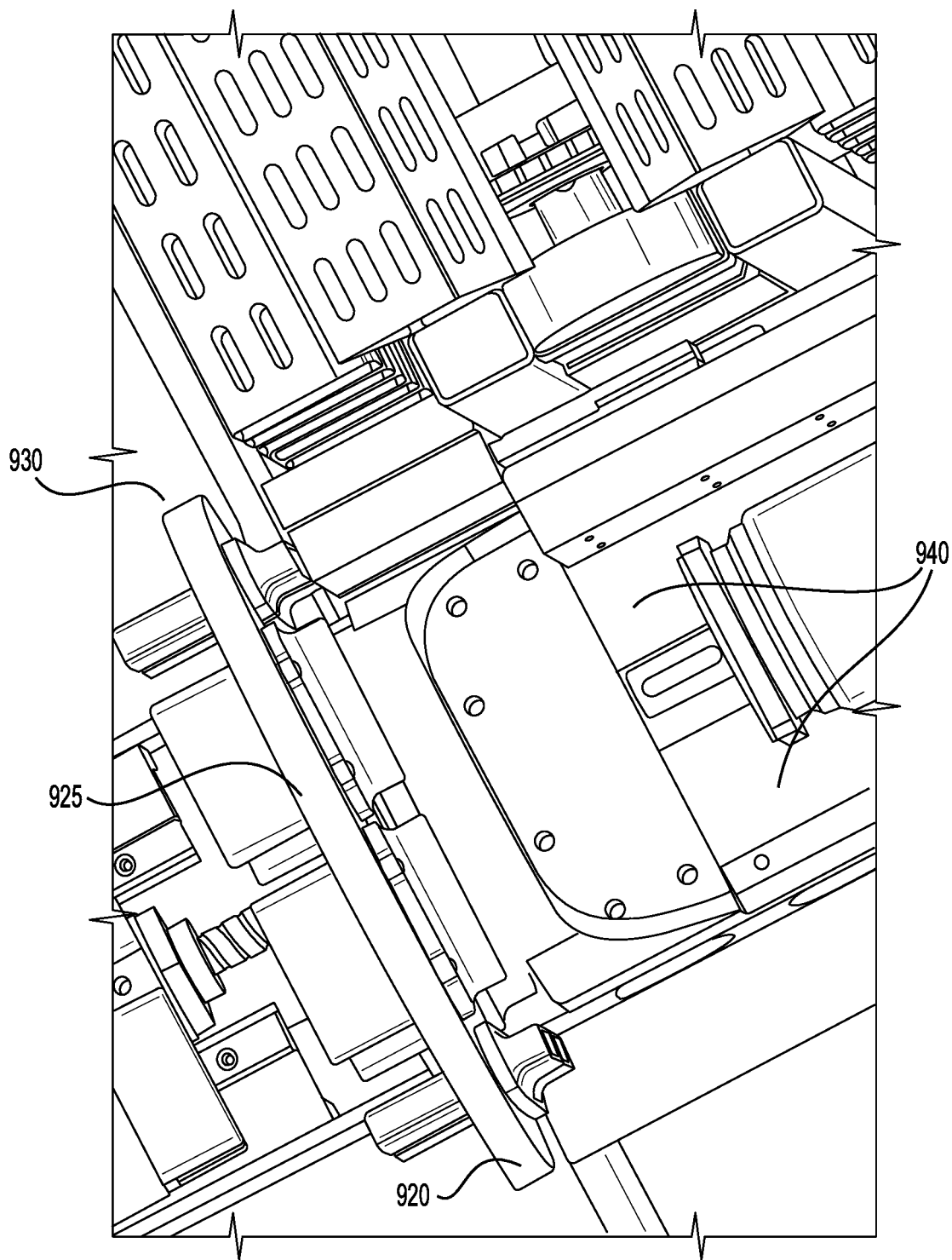
FIG. 14 provides a perspective view of a portion of the system shown in FIG. 1 proximate the spring inserter and conveyor, in accordance with an exemplary embodiment of the present invention.

After weld(s) by the second welder 135, each compressed spring is enclosed in a pocket of the fabric. At this point, in accordance with some embodiments of the present invention, the spring coils are maintained in a compressed state while traversing through the first and second welders 130 135. The fabric containing the pocketed, compressed spring coils is traversed towards a spring expander (not shown). For example, in some embodiments, and as shown in FIG. 11b, opposing conveyor belts 1105 and 1110, which can have smooth, projectionless surfaces, can be located proximate the second welder 135. As shown in FIG. 11b, the top and bottom plies of the folded fabric can be compressed between the opposing conveyor belts 1105, 1110. Once the fabric exits the conveyor belts 1105, 1110, the compressed spring coil inside the fabric can begin to expand, and a rotating wheel 1115 can engage a top end of the compressed coil as the coil passes by the rotating wheel 1115 and forces the top end to further splay and immediately deploy to a decompressed state. The spring expander can be configured to allow the springs to expand within the pockets of the fabric. In some exemplary embodiments of the present invention, the spring expander can be configured to cause the compressed springs to rotate about 90 degrees after engagement by the rotating wheel and expand such that a longitudinal axis of the expanded spring coils is transverse to a longitudinal axis of the fabric (and parallel with a longitudinal axis of the corresponding pocket of the fabric). In some embodiments the spring expander can comprise a member that traverses an edge of the compressed spring to cause the compressed spring to rotate. In some embodiments of the present invention, the member can be U-shaped. In some embodiments of the present invention, the member can be pivotably attached to a body of the spring expander, such that pivoting of the member engages a portion of the compressed spring, causing the compressed spring to rotate and expand in the pocket. In some embodiments, the member can actuate translationally with respect to a body of the spring expander, such that during translational movement of the member, the member engages a portion of the compressed spring, causing the compressed spring to rotate and expand in the pocket.

In addition to systems for producing a string of pocketed spring coils, various embodiments of the present invention are also directed towards methods of producing a string of pocketed spring coils. Methods of the present invention can include one or more steps carried out by various system components described above.

Because various embodiments of the present invention allow multiple spring coils to be processed simultaneously (e.g., multiple spring coils are simultaneously produced, transported, compressed, and inserted), the present invention allows a string of coils to be produced in a much faster and more efficient manner than conventional systems.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A spring inserter system comprising:
a rotating member comprising a plurality of sides; and
at least one aperture disposed on each of the plurality of sides, each of the apertures configured to receive coil springs compressed along longitudinal axes of the springs, the plurality of apertures configured to provide a force to a received coil spring sufficient to maintain a compressed state of the coil spring when the coil is positioned within the aperture, wherein the spring inserter system is configured to rotate the rotating member from a first position, at which a coil spring is received into a first aperture, to a second position such that the coil spring received into the first aperture can be ejected from the aperture.

2. The system of claim 1, wherein the first position is an input position and the second position is an output position.

3. The system of claim 2, wherein the second position is approximately 270° from the first position.

4. The system of claim 1, wherein each of the apertures has a height having a height dimension and a width having a width dimension, and wherein the width dimension is greater than the height dimension.

5. The system of claim 4, wherein a longitudinal axis of a coil spring received into an aperture is perpendicular to the width of the aperture.

6. The system of claim 4, wherein the width dimension is about equal to a maximum diameter of coil springs.

7. The system of claim 1, wherein the at least one aperture disposed on each of the plurality of sides is a first aperture disposed on each of the plurality of sides, the system further comprising:
a second aperture disposed on each of the plurality of sides,
wherein the spring inserter system is configured to substantially simultaneously receive a first coil spring into a first aperture on a first side and a second coil spring into a second aperture on the first side, and
wherein, upon rotating from the first position to the second position, the first coil spring and second coil spring can be substantially simultaneously ejected from the first and second apertures, respectively.

8. The system of claim 1, further comprising a spring insertion arm configured to extend at least partially into an aperture to eject a compressed spring coil located within the aperture when the rotating member is at the second position, the compressed spring coil ejected out of the aperture and between top and bottom surfaces of a folded piece of fabric.

9. The system of claim 8, wherein the spring insertion arm comprises a first end having top and bottom surfaces, at least one of the top and bottom surfaces extending further towards the first end than the other of the top and bottom surfaces, such that the at least one of the top and bottom surfaces engages a corresponding top or bottom portion of the compressed spring prior to the other of the top and bottom surfaces engaging the other of the corresponding top or bottom portion of the compressed spring when the spring insertion arm ejects the compressed spring, which causes the ejected compressed spring to be inserted between the top and bottom surfaces of the folded piece of fabric in a splayed position with a longitudinal axis forming a non-normal angle with respect to both of the top and bottom surfaces of the folded piece of fabric.

* * * * *